United States Patent Office
3,022,304
Patented Feb. 20, 1962

3,022,304
ANTHRAQUINONE VAT DYESTUFF CONTAINING A REACTIVE TRIAZINE NUCLEUS
Max Staeuble, Basel, and Kurt Weber, Bottmingen, Switzerland, assignors to Ciba Limited, Basel, Switzerland
No Drawing. Filed May 25, 1959, Ser. No. 815,266
Claims priority, application Switzerland May 30, 1958
1 Claim. (Cl. 260—249)

This invention is directed to a new and valuable anthraquinone vat dyestuff of the formula

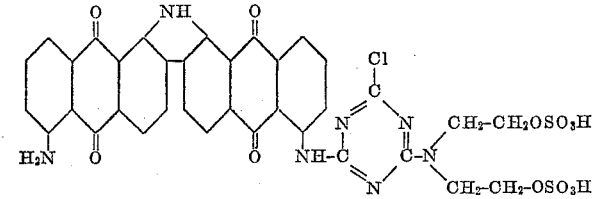

The following examples illustrate the invention, the parts and percentages being by weight:

Example 1

23 parts of 5:5'-diamino-1:1'-dianthrimide carbazole are heated in 600 parts of nitrobenzene with 37 parts of cyanuric chloride for 20 hours at 160° C. After 4 hours 1 part of pyridine is added to the reaction mixture. The whole is allowed to cool and the product is filtered off, washed successively with nitrobenzene, benzene and chloroform and dried at 100° C. under reduced pressure.

12.1 parts of the condensation product thus obtained, which corresponds to the formula

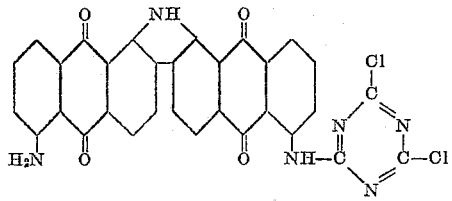

are stirred in 100 parts of nitrobenzene for 15 minutes at 90° C. In the course of 5 hours, 4.2 parts of diethanolamine in 50 parts of chloroform are then slowly added dropwise, and the whole is maintained for 17 hours at 90° C., and then allowed to cool. The product is filtered off, washed successively with benzene, alcohol and water and dried at 100° C. in vacuo.

10 parts of the resulting condensation product of the formula

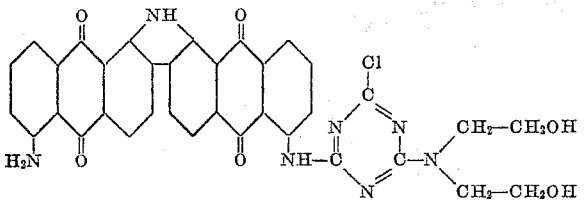

are dissolved in the course of 10 minutes at 0 to 5° C. in 100 parts of sulfuric acid of 100% strength, and the resulting solution is immediately poured cautiously over 1000 parts of ice. The precipitated product is filtered off, washed with cold water until it is neutral, and dried at 70 to 80° C. under reduced pressure.

The dyestuff of the formula

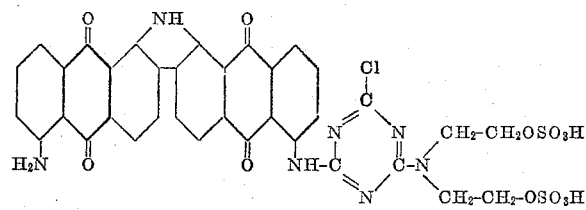

is insoluble in water, but is distinguished by the ease with which it can be vatted. When used for dyeing cotton or regenerated cellulose by the method described in Example 2, it yields brown-orange dyeings having good fastness properties.

Example 2

1 part of the dyestuff obtained as described in Example 1 is pasted with 250 parts of warm water. The resulting dyestuff suspension is added to a solution, heated at 50° C., of 10 parts by volume of sodium hydroxide solution of 30% strength and 6 parts of sodium hydrosulfite in 1750 parts of water, and the mixture is vatted for 1 minute. 50 parts of cotton are dyed in the resulting dyebath for 45 minutes at 50 to 60° C. with the addition of 60 parts of sodium chloride. The dyed material is washed, oxidized, acidified, again thoroughly rinsed, and finally soaped at the boil. A brown-orange dyeing of very good fastness properties is obtained.

What is claimed is:
The dyestuff of the formula

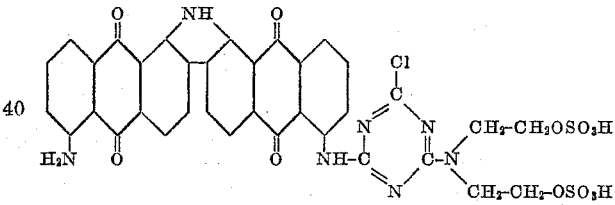

References Cited in the file of this patent
UNITED STATES PATENTS

| | | |
|---|---|---|
| 1,437,783 | Steinbuch et al. | Dec. 5, 1922 |
| 1,523,308 | Steinbuch et al. | Jan. 13, 1925 |
| 1,888,631 | Kunz | Nov. 22, 1932 |
| 1,897,428 | Hentrich et al. | Feb. 14, 1933 |
| 2,373,826 | Graham | Apr. 17, 1945 |
| 2,671,785 | Hardy et al. | Mar. 9, 1954 |
| 2,671,786 | Scalera | Mar. 9, 1954 |
| 2,773,871 | Brassel et al. | Dec. 11, 1956 |
| 2,889,323 | Heslop | June 2, 1959 |
| 2,951,842 | Ebel et al. | Sept. 6, 1960 |

FOREIGN PATENTS

| | | |
|---|---|---|
| 449,477 | Great Britain | June 24, 1936 |
| 802,935 | Great Britain | Oct. 15, 1958 |
| 91,206 | Norway | Jan. 18, 1958 |